United States Patent
Adamek

(10) Patent No.: US 7,819,182 B2
(45) Date of Patent: Oct. 26, 2010

(54) STRESS, STRAIN AND FATIGUE MEASURING OF WELL PIPING

(75) Inventor: Frank C. Adamek, Pasadena, TX (US)

(73) Assignee: Vetco Gray Inc., Houston, TX (US)

( * ) Notice: Subject to any disclaimer, the term of this patent is extended or adjusted under 35 U.S.C. 154(b) by 0 days.

(21) Appl. No.: 12/137,283

(22) Filed: Jun. 11, 2008

(65) Prior Publication Data

US 2008/0314577 A1 Dec. 25, 2008

Related U.S. Application Data

(60) Provisional application No. 60/944,895, filed on Jun. 19, 2007.

(51) Int. Cl.
*E21B 43/00* (2006.01)
*E21B 47/09* (2006.01)
*E21B 19/22* (2006.01)
*E21B 33/035* (2006.01)

(52) U.S. Cl. .................. 166/66; 166/250.01; 166/77.1; 166/368

(58) Field of Classification Search ............ 166/250.01, 166/66, 88.4, 208, 75.14
See application file for complete search history.

(56) References Cited

U.S. PATENT DOCUMENTS

| | | | | |
|---|---|---|---|---|
| 4,409,824 A | * | 10/1983 | Salama et al. | ............ 73/152.48 |
| 5,172,112 A | * | 12/1992 | Jennings | ..................... 340/850 |
| 5,582,438 A | * | 12/1996 | Wilkins et al. | ................. 285/26 |
| 6,155,347 A | * | 12/2000 | Mills | ...................... 166/250.03 |
| 6,470,971 B1 | * | 10/2002 | Bridges | ....................... 166/379 |
| 6,957,574 B2 | * | 10/2005 | Ogle | ........................ 73/152.48 |
| 2005/0234648 A1 | | 10/2005 | Economides et al. | |
| 2006/0173638 A1 | * | 8/2006 | Hovis et al. | .................... 702/42 |
| 2006/0271299 A1 | * | 11/2006 | Ward et al. | ...................... 702/6 |
| 2007/0221407 A1 | | 9/2007 | Bostick, III et al. | |
| 2008/0121400 A1 | * | 5/2008 | Allen | ......................... 166/375 |

FOREIGN PATENT DOCUMENTS

GB 2402478 A 12/2004

OTHER PUBLICATIONS

DMI, Direct Measurement, Inc.—Found at www.directmeasure.com—Copyright 2002—2008—5 pages.

* cited by examiner

*Primary Examiner*—Kenneth Thompson
*Assistant Examiner*—James G Sayre
(74) *Attorney, Agent, or Firm*—Bracewell & Giuliani

(57) ABSTRACT

A system for monitoring strain in a wellbore casing includes one or more gages that are affixed to an outer surface of the wellbore casing. Each gage includes one or more apertures. During operation, variations in the shape and spacing of the apertures are monitored and used to determine a level of strain in the wellbore casing.

20 Claims, 3 Drawing Sheets

STRESS, STRAIN AND FATIGUE MEASURING OF WELL PIPING

CROSS REFERENCE TO RELATED APPLICATIONS

This application claims the benefit of the filing date of U.S. provisional application Ser. No. 60/944,895, filed on Jun. 19, 2007, the disclosure of which is incorporated herein by reference.

FIELD OF THE INVENTION

This disclosure relates in general to measuring stress, strain, and fatigue of tubular oil and gas well equipment, and particularly to conduits located within a wellhead housing.

BACKGROUND OF THE INVENTION

In one type of offshore well system, a surface wellhead assembly is located at the upper end of a riser that extends downward to a subsea wellhead assembly. The surface wellhead assembly is mounted stationarily on an offshore platform that has legs extending to the seafloor. The riser and surface wellhead assembly are stationary relative to the platform and not subject to wave and current movements.

A casing hanger is supported on a load shoulder of the surface wellhead assembly. The casing hanger supports a string of casing, which has a lower end that latches or ties back to a subsea casing hanger in the subsea wellhead housing at the seafloor. The operator wishes to apply tension to the string of casing to a desired level and to maintain the casing string at that amount of tension. Applying and maintaining the tension may be handled in different ways. For example, a ratcheting mechanism may be employed. The ratcheting mechanism allows part of the casing hanger to ratchet upward relative to the surface wellhead assembly, but not downward so as to hold tension. Alternately, the casing hanger may have an adjustable load shoulder that secures to external threads on the casing hanger. The casing hanger may also have an interior profile for securing to a running tool. While one portion of the running tool pulls upward on the casing hanger to provide the desired amount of tension in the string of casing, another portion of the running tool rotates the adjustable landing shoulder downward into contact with the load shoulder in the surface wellhead assembly.

After the string of casing has been tensioned and the casing hanger landed, the operator would typically remove the running tool, then install a seal or packoff between the outer diameter of the upper portion of casing hanger 23 and the bore in the surface wellhead assembly.

While installing the casing string, it would be advantageous to be able to know the strain and the amount of tension that exists after the casing hanger is set. Also, from time to time it would useful to monitor the strain to determine if the initial tension has decreased, such as might occur if the platform settles. Fatigue can occur due to cycles of stress, either from thermal changes or other factors. Although the surface wellhead assembly is located on a platform above the sea, the casing hanger is concealed within the surface wellhead housing and the casing string within the riser. Consequently, conventionally measuring strain in the same manner as one would to accessible conduits is not possible.

SUMMARY

The offshore well system of this invention has a subsea wellhead and a surface wellhead for location on a platform above water. The surface wellhead has a longitudinal axis and a sidewall containing a viewing port. A casing hanger assembly is landed within the surface wellhead. A string of casing has a lower end latched into the subsea wellhead and an upper end secured to the casing hanger assembly. The casing hanger assembly is axially adjustable within the surface wellhead for retaining a selected amount of tension in the string of casing;

At least one geometric pattern is located on an outer surface of the casing hanger assembly. The pattern provides a visible change in dimension in response to a change in tension in the portion of the casing hanger assembly on which the pattern is located. The pattern is located inward from the viewing port. An optical reader is positioned within the viewing port in sight of the pattern to monitor any change in the dimensions in the pattern and providing a signal in response. A controller operably coupled to the optical reader determines the tension in the string of casing in response to the signal provided by the optical reader.

The geometric pattern preferably comprises a plurality of geometric patterns located in an axial row on the outer surface of the casing hanger assembly. If the casing hanger assembly is axially adjusted sufficiently in the surface wellhead, at least one of the patterns disappears from view and another appears in view by the optical reader. Also, in the preferred embodiment, there are several axial rows of patterns positioned around at least part of a circumference of the casing hanger assembly; at least one of the patterns is viewable by the reader regardless of the orientation of the casing hanger assembly in the surface wellhead.

Preferably, the pattern comprises a polymer film attached to the casing hanger assembly. The polymer film may have geometrically arranged apertures, the dimensions of which change in response to tension applied to the casing hanger assembly. Alternately, the pattern may be etched into the outer surface of the casing hanger assembly.

The viewing port is preferably oriented radially relative to the axis of the casing hanger assembly. The optical reader may be exposed to any pressure contained in the surface wellhead. The optical reader has a lens and a light source for illuminating the pattern.

DETAILED DESCRIPTION

Figure 1:
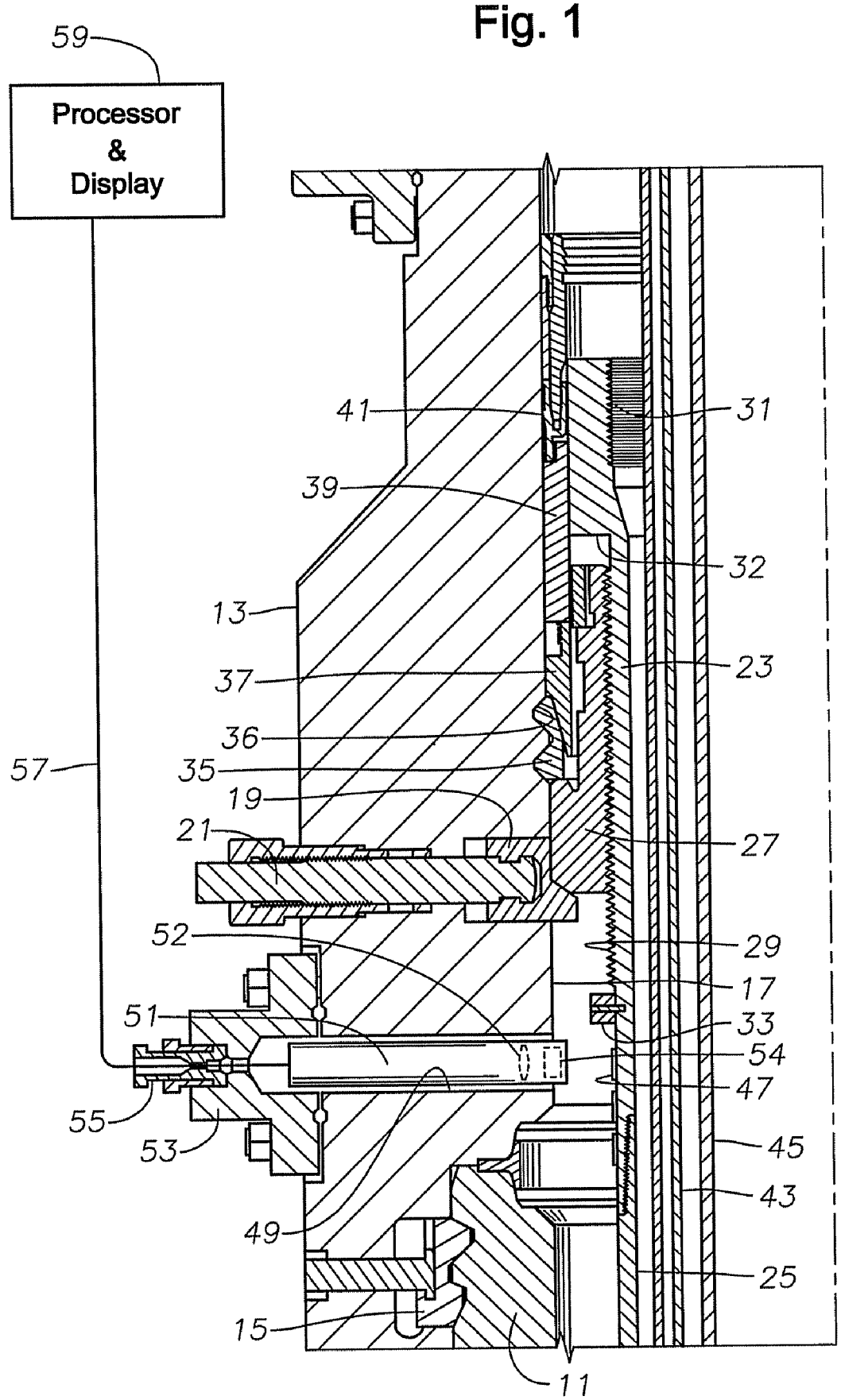
FIG. 1 is quarter-sectional view of a portion of a surface wellhead assembly of an offshore well, and shown having a measuring system in accordance with an exemplary embodiment.

In the drawings and description that follows, like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Figure 5:
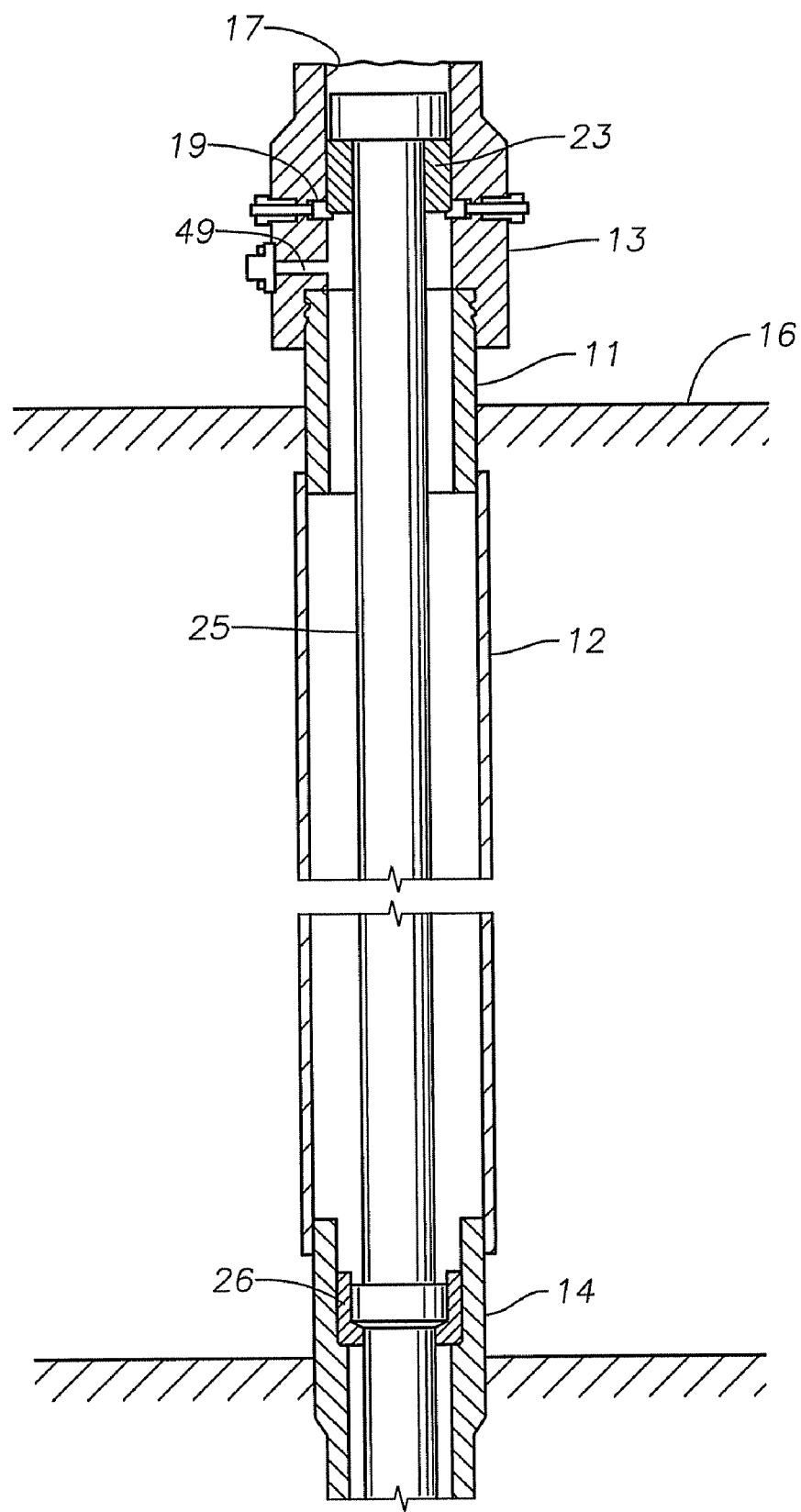
FIG. 5 is a schematic view illustrating a string of casing extending from a surface wellhead on a platform to a subsea wellhead, the surface wellhead having a view port for an optical reader in accordance with this invention.

Referring to FIGS. 1 and 5, a housing 11 is located at the upper end of a riser 12 that extends downward to a subsea wellhead assembly 14. Housing 11 is mounted stationarily on an offshore platform 16 in this example, and the platform has legs that extend to the seafloor. The riser 12 and housing 11 are stationary relative to the platform 16 and not subject to wave and current movements.

Another component of the surface wellhead assembly includes a casing head 13 mounted on housing 11 by a connector 15. Casing head 13 is a tubular member having a bore 17 extending through it. Casing head 13 has a plurality of load shoulders 19, which in this example are retractable. Each load shoulder 19 is retracted by a screw assembly 21 in this embodiment, as shown in FIG. 1. While in the extended position shown in FIG. 1, load shoulders 19 protrude into bore 17. Alternatively, load shoulders 19 could comprise a single fixed load shoulder.

A casing hanger 23 is supported on load shoulders 19. Casing hanger 23 supports a string of casing 25, which has a lower end that latches or ties back to a subsea casing hanger 26 in the subsea wellhead housing 14 at the seafloor. The operator wishes to apply tension to casing 25 to a desired level and to maintain casing 25 at that amount of tension. Applying and maintaining the tension may be handled in different ways. For example, a ratcheting mechanism may be employed. The ratcheting mechanism allows part of the casing hanger to ratchet upward relative to the casing head, but not downward so as to hold tension. In this embodiment, however, as shown in FIG. 1, casing hanger 23 has an outer body 27 that secures to external threads 29 on casing hanger 23 and serves as an adjustable load shoulder for casing hanger 23. Casing hanger 23 also has a set of interior threads 31 or a profile for securing to a running tool (not shown). While one portion of the running tool pulls tension on casing hanger 23 to provide the desired amount of tension in casing 25, another portion of the running tool rotates outer body 27 downward into contact with load shoulders 19. In FIG. 1, the upper end of outer body 27 is shown spaced below a downward facing shoulder 32 on the upper portion of casing hanger 23. While being run-in, the upper end of outer body 27 will be in contact with downward facing shoulder 32. A stop ring 33 located at the lower end of threads 29 provides a limit to how far downward outer body 27 can be rotated.

Also, in this embodiment, a mechanism may optionally be included to prevent any upward movement of casing hanger 23 relative to casing head 13 after installation. This mechanism includes a lock ring 35 that is a split ring that is expanded outward into a mating profile 36 by means of a tapered energizing ring 37. After outer body 27 has been rotated downward into contact with load shoulders 19, the running tool pushes energizing ring 37 downward to move lock ring 35 into profile 36.

After casing 25 has been tensioned and outer body 27 set, the operator would typically remove the running tool, then install a seal 41. Seal 41 is located on the upper end of a spacer 39 that contacts the upper end of energizing ring 37. Seal 41 may be of various types, either metal-to-metal or elastomeric. Seal 41 seals between the outer diameter of the upper portion of casing hanger 23 and casing head bore 17.

In this example, two additional casing strings 43 are shown extending through casing 25. Each string 43 may be tensioned and supported similarly in casing heads located above casing head 13. Also, a string of production tubing 45 is shown extending through inner casing string 43. Tubing string 45 may also be tensioned and supported in a tubing head in the same manner.

While installing casing strings 25, 43 and tubing 45, it would be advantageous to be able to know the strain and the amount of tension that exists after the casing hangers or tubing hanger are set. Also, from time to time it would useful to monitor the strain to determine if the initial tension has decreased, such as might occur if the platform settles. Fatigue can occur due to cycles of stress, either from thermal changes or other factors. Although casing head 13 and the various housings for the casing strings 43 and tubing 45 are located on a platform 16 (FIG. 5) above the sea, casing strings 25, 43 and tubing 45 are concealed within the housings and other tubular members. Consequently, conventionally measuring strain in the same manner as one would to accessible conduits is not possible.

Figure 3:
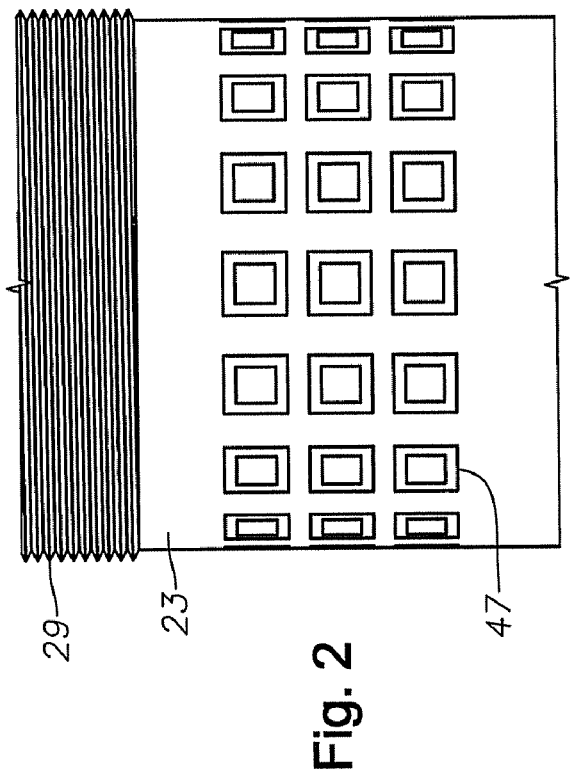
FIG. 3 is an enlarged view illustrating a measuring gage that is bonded to the casing hanger as illustrated in FIG. 2.

In this exemplary embodiment, a plurality of gages 47 or geometric patterns are mounted on casing hanger 23 below threads 29 and thus below outer body 27. Each gage 47 is of a type that will provide an indication of strain without requiring any wires or a battery. As shown schematically in FIG. 3, each gage 47 is a thin film of a polymer that is coated with an adhesive for bonding to a metal conduit. Alternately, each gage 47 could be laser etched directly onto the steel body of casing hanger 23. Each gage 47 has a plurality of apertures 46 that are laser-machined in a geometric pattern. Apertures 46 are spaced evenly apart from each other in a row and are preferably identically sized. In this example, apertures 46 extend axially along one side edge of gage 47 and horizontally along another side edge. When tension is applied, gage 47 stretches slightly, changing the spacing between apertures 46. This change in spacing is detectable and provides an indication of the stress being applied and the strain occurring.

Optionally, each gage 47 may have one or two rows of apertures 48 that are spaced apart from each other different amounts and have different widths to define a bar code containing information. In this example, apertures 48 extend along the other axial side edge and other horizontal edge from apertures 46. Optionally, a central aperture 50 may be cut in the film of gage 47, but that is not necessary.

A reader 51 optically reads apertures 46, 48 of gage 47 and provides direct measurement of strain and other information. Reader 51 has a lens 52, a ring light source 54 and strain measurement software. Reader 51 is located within a view port 49 that extends through the sidewall of casing head 13. Preferably, view port 49 is located on a radial line of the axis of casing head 13. A flange 53 bolts to the exterior of casing head 13 around view port 47. An electrical lead 57 extends through a seal assembly 55 of flange 53 and extends to a processor and display 59 that may be located on another level on the platform, such as at the rig floor. Processor 59 contains algorithms that will provide a readout of strain directly based on the optical reading of reader 51. Gages 47, reader 51 and processor 59 are commercially available. One manufacturer is Direct Manufacturing, Inc., Columbia, S.C.

Figure 2:
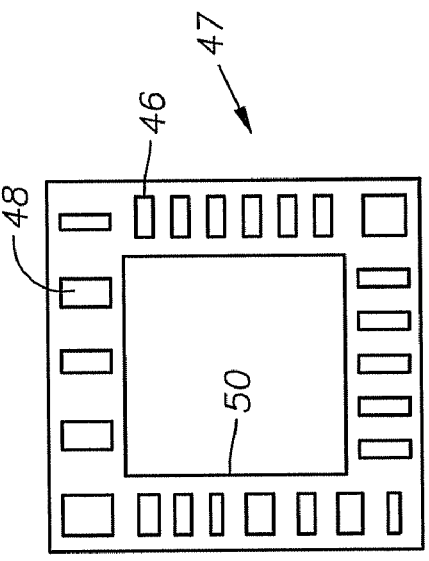
FIG. 2 is a schematic side elevational view of a portion of the casing hanger of the wellhead assembly of FIG. 1.

Because the operator will not know in advance exactly how much stretch will exist in casing 25 once tensioned, preferably a plurality of gages 47 are mounted to casing hanger 23 and axially spaced apart from each other. FIG. 2 shows three circumferential rows of gages 47 and they are axially spaced so that with the least amount of stretch expected, the upper circumferential row will be visible to reader 51. With the maximum amount of stretch in casing 25 expected, the lower circumferential row of gages 47 would be readable by reader 51.

Also, typically while running casing 25, the operator does not orient casing hanger 23 to any particular rotational position relative to casing head 13. While orientation can be done, an alternative is to mount a number of gages 47 in horizontal or circumferential rows extending completely around casing hanger 23. At least one of the gages 47 will always be aligned with reader 51, regardless of the orientation of casing hanger 23. In addition, more than one view port 49 is preferably employed, with the view ports being spaced circumferentially around casing head 13. The additional view ports 49 allow an operator to insert reader 51 and make readings from different sides of casing hanger 23.

In the preferred embodiment, a reader 51 is positioned in casing head 13 while casing 25 is being tensioned. The operator will thus be able to read the strain directly from the display of processor 59 while the tensioning procedure is occurring. The operator will thus know the level of tension that exists in casing 25 after the running tool has been disconnected from casing hanger 23 and outer body 27 landed on load shoulders 19. Afterward, the operator can remove reader 51 and use it for tensioning inner casing strings 43 and tubing 45, each of which will contain gages 47 attached to their hangers in a similar manner.

Figure 4:
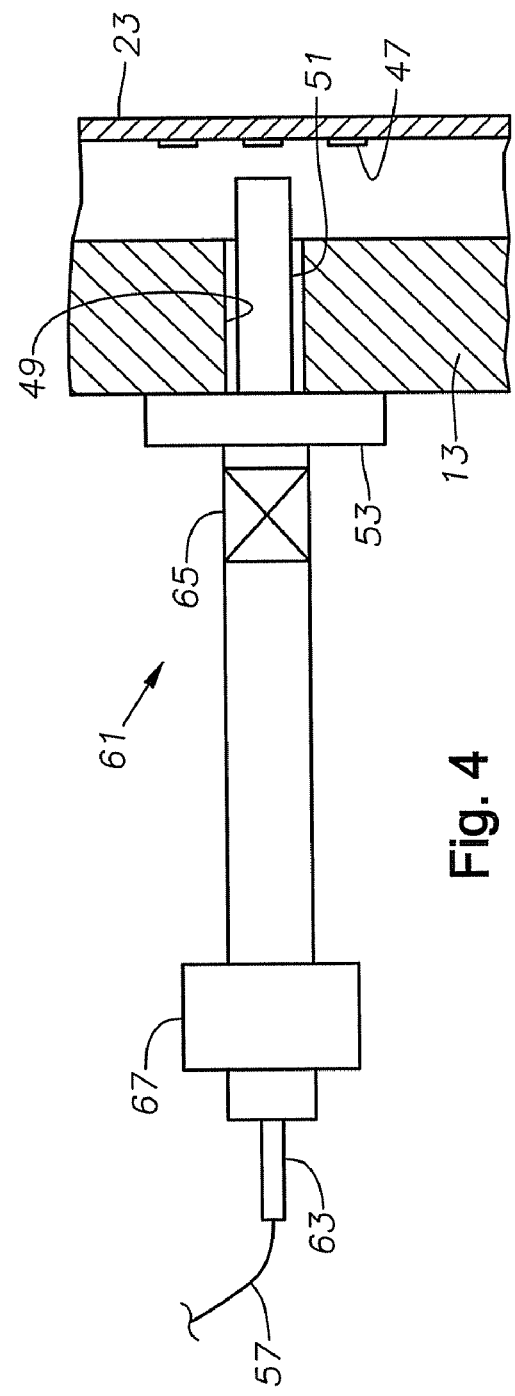
FIG. 4 is a schematic sectional view illustrating inserting a reader under a pressure controlled environment for reading one of the gages of FIG. 2.

Also, periodically the operator can insert reader 51 into one of the view ports 49 to monitor the strain in subsequent years. This information allows the operator to determine the tension and fatigue. If pressure control is needed, this can be readily handled by the use of a lubricator assembly 61, schematically shown in FIG. 4. The operator inserts reader 51 into view port 49 on an insertion tool 63. Insertion tool 63 comprises a tubular rod through which lead 57 will extend. Lubricator assembly has a valve 65, on its inner end and an injection head 67 on its outer end. The operator closes valve 65 and inserts reader 51 into a chamber located between valve 65 and injection 67. Injection head 67 is a conventional sealing mechanism that typically employs a pump that pumps grease around a tubular member to form a seal and simultaneously allow the tubular member to be moved along its axis. In this application, injection head 67 is actuated to maintain a seal around insertion tool 63 while valve 65 is opened and insertion tool 63 pushed inward to push reader 51 into close proximity to one of the gages 47. After taking a reading, the operator reverses the procedure to remove reader 51.

It is understood that variations may be made in the above without departing from the scope of the invention. While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

The invention claimed is:

1. An offshore well system, comprising:
a subsea wellhead;
a surface wellhead for location on a platform above water, the surface wellhead having a longitudinal axis and a sidewall containing a viewing port;
a casing hanger assembly landed within the surface wellhead;
a string of casing having a lower end latched into the subsea wellhead and an upper end secured to the casing hanger assembly, the casing hanger assembly being axially adjustable within the surface wellhead for retaining a selected amount of tension to the string of casing;
at least one pattern on an outer surface of the casing hanger assembly, the pattern being a geometric series of lines providing a visible change in dimension in response to a change in tension in the portion of the casing hanger assembly on which the pattern is located, the pattern being located inward from the viewing port;
an optical reader positioned within the viewing port in sight of the pattern to monitor any change in the dimensions in the pattern and provide a signal in response; and
a controller operably coupled to the optical reader for determining the tension in the string of casing in response to the signal provided by the optical reader.

2. The system of claim 1, wherein said at least one pattern comprises a plurality of the patterns located in an axial row on the outer surface of the casing hanger assembly, so that if the casing hanger assembly is axially adjusted sufficiently in the surface wellhead to cause at least one of the patterns to disappear from view by the optical reader, another appears in view.

3. The system of claim 1, wherein said at least one of the patterns comprises a plurality of the patterns positioned around at least part of a circumference of the casing hanger assembly, so that at least one of the patterns is viewable by the optical reader regardless of the orientation of the casing hanger assembly in the surface wellhead.

4. The system of claim 1, wherein said at least one of the pattern comprises a polymer film attached to the casing hanger assembly, the polymer film having the series of lines arranged into apertures, the dimensions of the apertures changing in response to tension applied to the casing hanger assembly.

5. The system of claim 1, wherein the pattern is etched into the outer surface of the casing hanger assembly.

6. The system of claim 1, wherein:
said at least one pattern comprises a plurality of the patterns located in a plurality of axial rows on the outer surface of the casing hanger assembly, the axial rows being circumferentially spaced apart from each other and parallel to each other.

7. The system of claim 1, wherein the viewing port is oriented radially relative to the axis of the casing hanger assembly.

8. The system of claim 1, wherein the optical reader is exposed to any pressure contained in the surface wellhead.

9. The system of claim 1, wherein the optical reader comprises:
a lens and a light source for illuminating the pattern.

10. The system of claim 1, wherein:
the casing hanger assembly has a landing shoulder; and
said at least one pattern is located below the landing shoulder.

11. An offshore well system, comprising:
a subsea wellhead;
a surface wellhead for location on a platform above water, the surface wellhead having a longitudinal axis;

a radially extending viewing port in a sidewall of the surface wellhead;

a casing hanger assembly having a landing shoulder that lands within the surface wellhead;

a string of casing having a lower end latched into the subsea wellhead and an upper end secured to the casing hanger assembly, the casing hanger assembly being axially adjustable within the surface wellhead for retaining a selected amount of tension in the string of casing;

an axially extending row of geometric patterns located on an outer surface of the casing hanger assembly below the landing shoulder, each of the patterns containing a series of apertures that provide a visible change in dimension in response to a change in tension in the casing hanger assembly below the landing shoulder, at least one of the geometric patterns being located radially inward from the viewing port regardless of the tension within the casing hanger assembly below the landing shoulder;

an optical reader sealingly mounted within the viewing port in sight of at least one of the patterns in the axially extending row to monitor any change in the dimensions in the apertures of any of the patterns that are visible and provide a signal in response; and a controller operably coupled to the optical reader for determining the tension in the string of casing in response to the signal provided by the optical reader.

12. The system according to claim 11, wherein said at least one axially extending row comprises a plurality of axially extending rows of the geometric patterns, the axially extending rows being parallel to each other and spaced circumferentially apart from each other.

13. A method of monitoring tension in a string of casing extending from a subsea wellhead to a surface wellhead on a platform above water, the string of casing being supported in the surface wellhead by a casing hanger assembly, comprising:

(a) providing at least one geometric pattern on an outer surface of the casing hanger assembly;

(b) mounting an optical reader in a port extending through a side wall of the surface wellhead;

(c) viewing an image of the geometric pattern with the optical reader, the image changing in response to the level of tension existing in the casing hanger assembly where the geometric patter is located; and (d) processing the image observed by the optical reader and providing a readout of the tension existing where the geometric pattern is located.

14. The method of claim 13, wherein the geometric pattern comprises a polymer film, and step (a) comprises adhering the polymer film to the outer surface of the casing hanger assembly.

15. The method of claim 13, wherein the casing hanger has a landing shoulder that is adjustable along an axis of the surface wellhead assembly, and the method further comprises:

pulling upward on the casing hanger assembly while performing steps (c) and (d); then adjusting an axial position of the landing shoulder and landing the landing shoulder in the surface wellhead housing; then repeating steps (c) and (d).

16. The method of claim 15, wherein step (a) comprises locating the geometric pattern below the landing shoulder.

17. The method of claim 15, wherein:

step (a) comprises providing a plurality of the geometric patterns within an axially extending row on the outer surface of the casing hanger assembly; and while pulling upward on the casing hanger assembly, at least one of the geometric patterns in the row will become visible to the optical reader during step (c) and then will disappear from view by the optical reader as continued pulling upward occurs.

18. The method of claim 15, wherein:

step (a) comprises providing a plurality of the geometric patterns spaced circumferentially apart from each other at least partly around the outer surface of the casing hanger assembly;

landing the landing shoulder in the surface wellhead occurs without orienting the casing hanger assembly relative to the port; and the optical reader views only part of the geometric patters in step (c).

19. The method of claim 15, further comprising:

after landing the shoulder in the surface wellhead and repeating steps (c) and (d), removing the optical reader from the port and closing the port; then returning at a later date and repeating steps (b), (c) and (d).

20. The method of claim 13, wherein step (c) comprises illuminating the geometric pattern with a light source in the optical reader.

\* \* \* \* \*

UNITED STATES PATENT AND TRADEMARK OFFICE
CERTIFICATE OF CORRECTION

PATENT NO. : 7,819,182 B2  
APPLICATION NO. : 12/137283  
DATED : October 26, 2010  
INVENTOR(S) : Adamek It is certified that error appears in the above-identified patent and that said Letters Patent is hereby corrected as shown below:

In Column 2, Line 7, delete "casing;" and insert -- casing. --, therefor.

in Column 4, Line 60, delete "47." and insert -- 49. --, therefor.

In Column 7, Line 44, in Claim 13, delete "patter" and insert -- pattern --, therefor.

In Column 8, Line 35, in Claim 18, delete "patters" and insert -- patterns --, therefor.

Signed and Sealed this
Fifth Day of April, 2011

David J. Kappos
*Director of the United States Patent and Trademark Office*